United States Patent [19]
Anderson

[11] 3,911,563
[45] Oct. 14, 1975

[54] METHOD OF ATTACHING ARMATURE COIL LEADS TO COMMUTATOR BARS

[75] Inventor: Dale L. Anderson, Mound, Minn.

[73] Assignee: Possis Corporation, Minneapolis, Minn.

[22] Filed: Mar. 25, 1974

[21] Appl. No.: 454,678

Related U.S. Application Data

[63] Continuation-in-part of Ser. No. 348,853, April 6, 1973, abandoned.

[52] U.S. Cl. .............. 29/597; 29/205 CM; 29/598; 73/37.6; 250/224; 250/233
[51] Int. Cl. .................... H02k 15/04; H02k 15/02
[58] Field of Search .................. 29/593, 597–598, 29/605, 203 MW, 203 P, 205 CM, 205 E, 205 R, 205 C, 205 D, 208 F, 203 R; 356/150–155, 172, 196, 198, 237, 240, 241, 141; 250/233, 224, 231 SE, 236; 310/233, 236, 179, 199; 73/37.6, DIG. 11, 432 L; 72/9; 242/7.03, 7.05 R, 7.05 A, 7.05 B, 7.05 C

[56] References Cited
UNITED STATES PATENTS

| | | |
|---|---|---|
| 2,770,798 | 11/1956 | Roth .............................. 250/233 X |
| 2,878,405 | 3/1959 | Merril ........................... 29/597 UX |
| 2,980,838 | 4/1961 | Leete ............................. 250/224 X |
| 3,421,212 | 1/1969 | Chabot .................................. 29/597 |
| 3,431,760 | 3/1969 | Martens ................................... 72/9 |
| 3,431,761 | 3/1969 | Clement ................................... 72/9 |
| 3,778,889 | 12/1973 | Mason ............................. 29/205 E |
| 3,791,569 | 2/1974 | Mims ............................... 29/597 X |

Primary Examiner—C. W. Lanham
Assistant Examiner—Joseph A. Walkowski

[57] ABSTRACT

A method of winding armatures which uses sensing instrumentalities to identify the actual characteristics of the unwound armature core assembly, automatically compares a record of those characteristics with a definition of a completely satisfactory armature core assembly, utilizes the results of that comparison to initiate the winding operation if the comparison is favorable, or withholds initiation of the winding operation if the comparison is unfavorable, and by which the identity of the actual characteristics of the armature core assembly are recorded in the memory of a computer to be used in effecting accurate indexing of the armature core assembly by means of an electric motor to which it is directly coupled and which motor is controlled by the computer.

25 Claims, 15 Drawing Figures

FIG. 1.
FIG. 2.
FIG. 3.
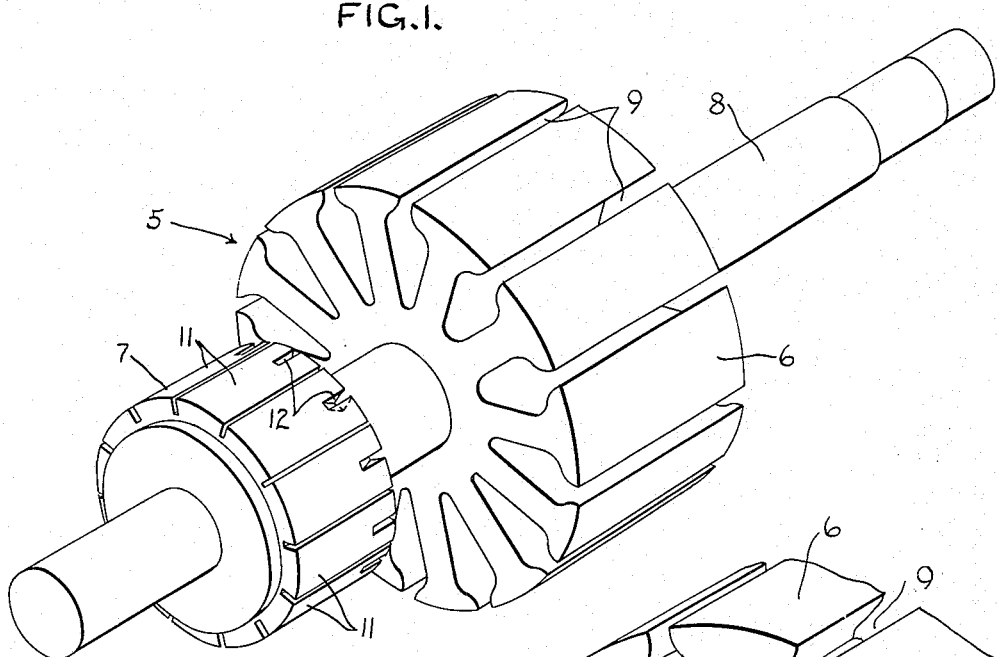
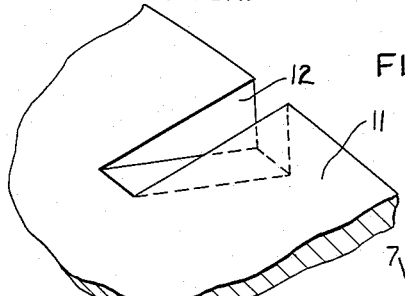
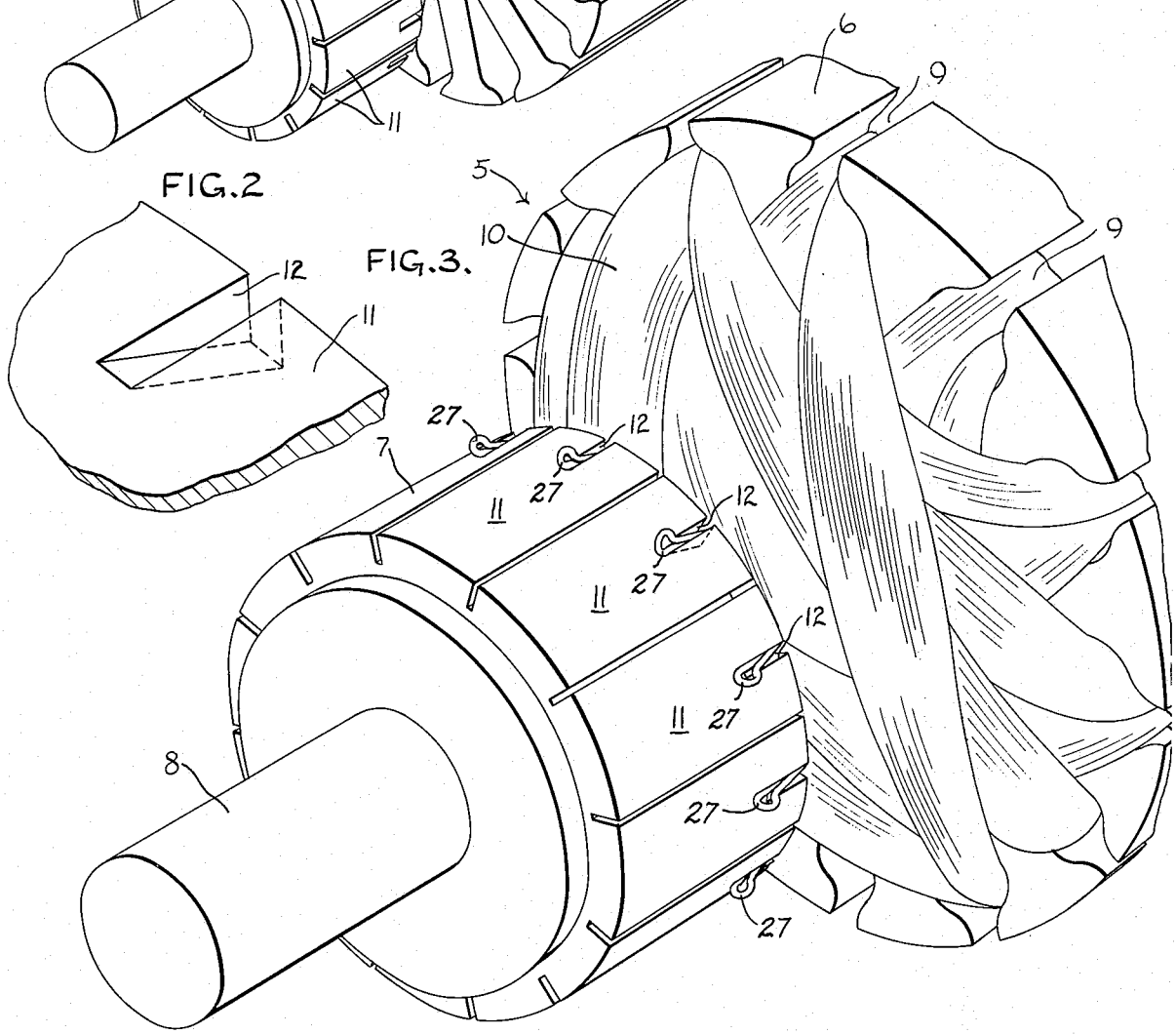

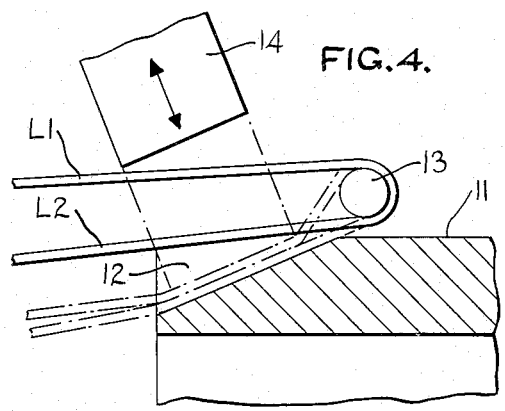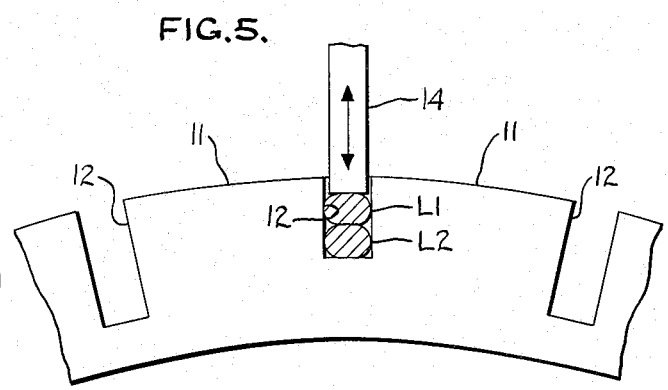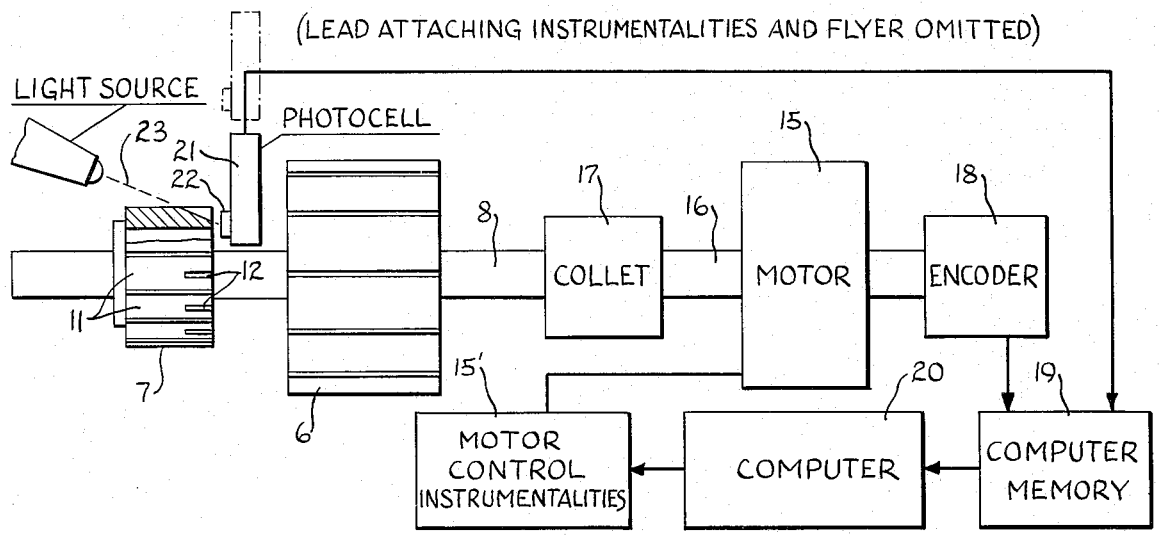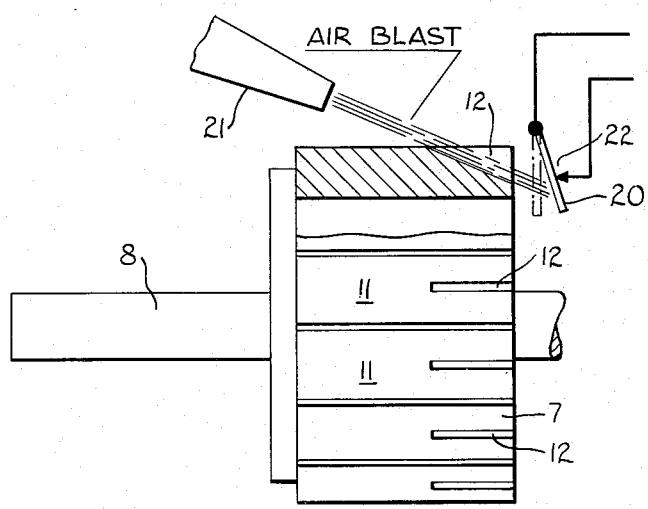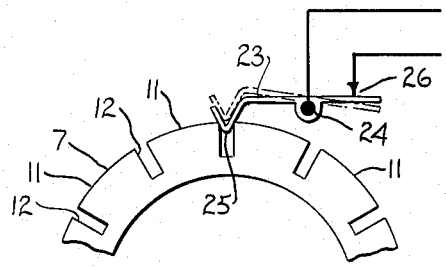

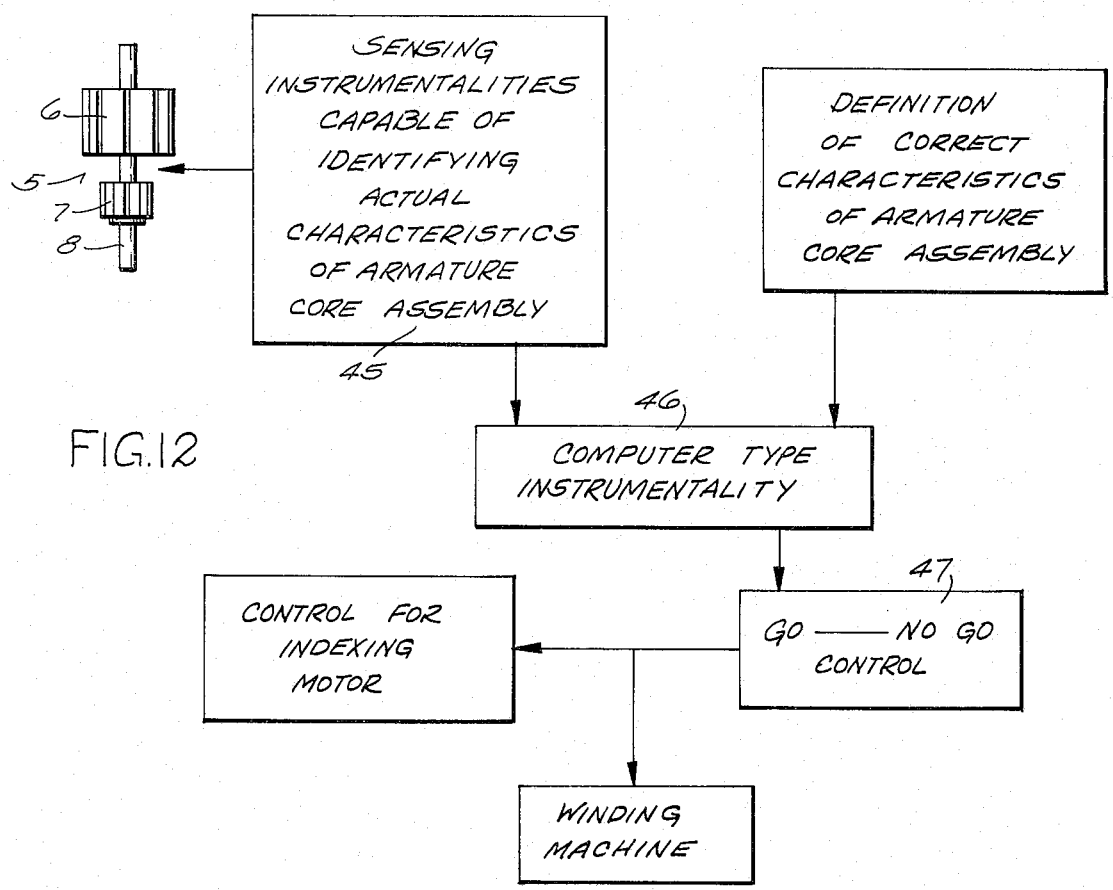
FIG.12
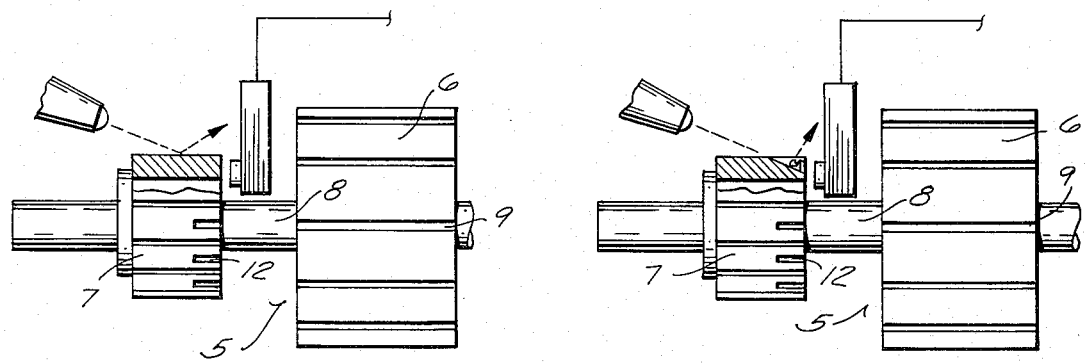
FIG. 13                  FIG. 14

METHOD OF ATTACHING ARMATURE COIL LEADS TO COMMUTATOR BARS

The instant application is a continuation-in-part of application Ser. No. 348,853, filed Apr. 6, 1973, and now abandoned.

This invention relates to the production of armatures for electric motors and the like, by means of automatic armature winding machines, and is an improvement upon the invention of Mario Del Bono disclosed in the U.S. application, Ser. No. 356,345, filed May 2, 1973, now Pat. No. 3,818,570, and assigned to the assignee of this invention.

The armatures with which these inventions are concerned, conventionally consist of a core with circumferentially spaced slots into which coils of wire are wound, and a commutator, both mounted in axially spaced relation on a common shaft. The commutator has circumferentially spaced segments or bars to which the starting and ending leads of the successively wound coils are physically and electrically connected.

The winding machines used to wind such armatures have at least one – and usually two – wire applying devices known as "flyers" that rotate about an axis which perpendicularly intersects the axis of the armature core assembly in position to have wire wound thereon. Each flyer draws wire from a source thereof and winds it into a pair of core slots until a coil of a predetermined number of turns has been completed.

At the completion of that coil or coils in the case of a double flyer machine, the flyers stop and then, through appropriate interaction between the mechanism by which the armature core assembly is held in the machine and lead gripping and holding instrumentalities coacting with the flyers, the leads are brought into juxtaposition to the commutator bars or segments to which they are to be attached.

The attachment of the wire leads to the commutator bars is effected in one of two different ways. The leads are either wrapped around hooks or tangs that project from the ends of the commutator bars nearest the armature core, or they are inserted - "stuffed" is the term used in the industry - into slots cut into the commutator bars. It is this latter procedure with which the present invention as disclosed in the aforesaid original application Ser. No. 348,853, deals.

To attach the leads to the commutator bars by the stuffing method, wire gripping devices that form part of lead attaching instrumentalities are brought into position to have the wires that extend from the flyers engaged therewith. Through coaction between the wire gripping or holding devices and the flyers, the held wires are formed into loops and the loops brought into juxtaposition to the mouths of the commutator bar slots into which they are to be stuffed. Then blade-like stuffing tools, which also form part of the lead-attaching instrumentalities, stuff the "legs" of the wire loops into their respective slots.

During this stuffing operation, the insulation is stripped off the wire and the thus bared wires are tightly wedged – one above the other – into the bottom of the slot.

In view of the relatively narrow width of the slot, even slight misalignment between the slot and the wire stuffing tool can result in collision between the stuffing tool and one or the other of the opposite sides of the slot. Hence, if damage to the stuffing tool and/or the commutator is to be avoided, accurate alignment is essential between the slot and the path along which the stuffing tool reciprocates.

At the conclusion of the winding of each coil, or pair of coils in the case of a two-flyer machine, the armature core assembly must be rotationally indexed to bring the next pair or pairs of core slots into winding receiving position. Also there must be relative rotation between the armature core assembly and the lead-attaching instrumentalities in order to bring the latter and the commutator bar to which the leads from the just-wound coils are to be attached into juxtaposition. The angle through which that relative rotation takes place might be small or relatively large, depending upon the winding pattern employed for the armature.

If the mechanism by which the required relative rotation between the lead-attaching instrumentalities and the commutator functioned with sufficient precision, the required accuracy of alignment could probably be achieved by that mechanism itself, but such precision in machines of this type is by no means predictable. Moreover, with the production methods by which commutators are manufactured, absolutely uniform spacing between commutator bars is but a hoped-for condition - to say nothing of the spacing between the slots that are cut into the commutator bars.

In recognition of the inevitability of misalignment between the lead-stuffing instrumentalities and the commutator slots as they are brought into juxtaposition by the mechanism employed to effect that operation, this invention accepts that condition and then corrects for it by controlling the drive means by which the relative rotation needed to effect the desired accurate alignment is produced, in accordance with a pre-sensed and prerecorded identification of the relative spacing of the slots in the commutator.

This invention thus broadly utilizes the teachings of the disclosure in the aforesaid Del Bono application Ser. No. 356,345, but improves thereon by obviating the need for sensing the location of the commutator bar slots during the winding of the armature. This is achieved by sensing the locations of all of the commutator bar slots with respect to uniformly spaced subdivisions of 360° of rotation of the commutator and recording that information in the memory bank of a computer before the winding operation is begun; and then utilizing that recorded information through the medium of the computer to control a motor by which the needed relative rotation between the commutator and the lead attaching instrumentalities is produced with such precision that accurate alignment between each commutator bar slot and the path of the lead stuffing tool is assured.

An aspect of this invention that was not included in the disclosure of the aforesaid original application is its adaptation to the indexing of the armature core assembly to bring the core slots quickly and accurately into winding receiving positions.

Another aspect of this invention that was not disclosed in the original application resides in its adaptation to the detection of a defective armature core assembly before the winding operation is begun and, upon such detection, withholding the winding operation until the defective armature core assembly is replaced with one that is not defective.

With these observations and objectives in mind, the manner in which the invention achieves its purpose will be appreciated from the following description and the accompanying drawings, which exemplify the invention, it being understood that changes may be made in the specific method and apparatus disclosed herein without departing from the essentials of the invention set forth in the appended claims.

The accompanying drawings illustrate several examples of the embodiment of the invention as practiced according to the best modes so far devised for the practical application of the principles thereof, and in which:

FIG. 1 is a perspective view of an unwound armature core assembly representative of the type with which this invention is concerned;

FIG. 2 is a fragmentary perspective view of a portion of one of the bars or segments of the commutator of the assembly;

FIG. 3 is a perspective view of the commutator end portion of the wound armature showing the manner in which the leads of the successively wound coils are attached to the commutator bars;

FIG. 4 is a detail longitudinal sectional view through one of the commutator bars and diagrammatically illustrating the manner in which the leads are stuffed into the commutator bar slot;

FIG. 5 is a cross sectional view on an enlarged scale through a portion of the commutator, showing leads being stuffed into a slot;

Figure 9:
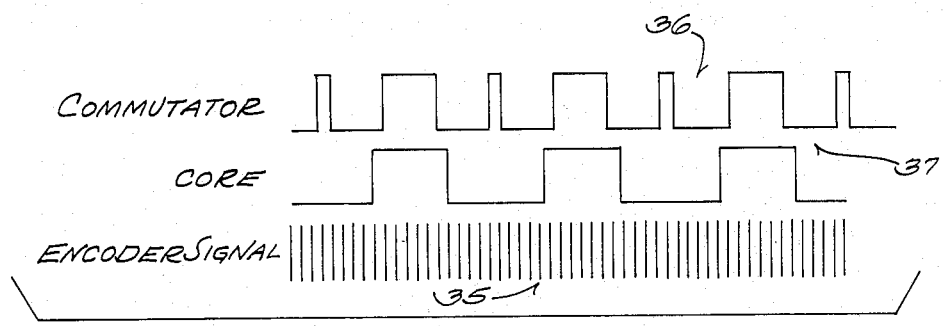
Figure 10:
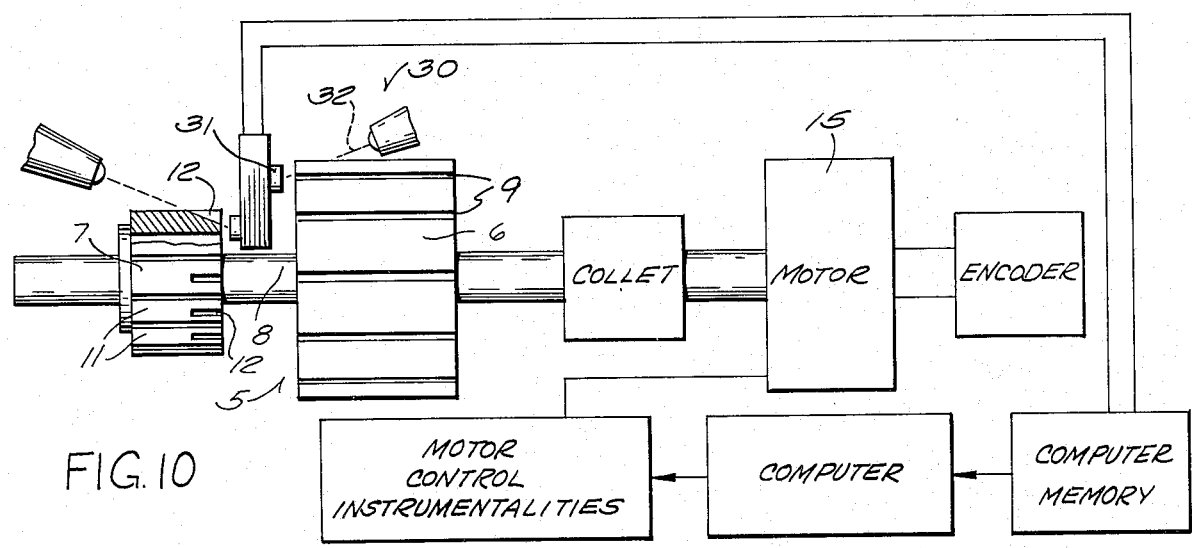
Figure 11:
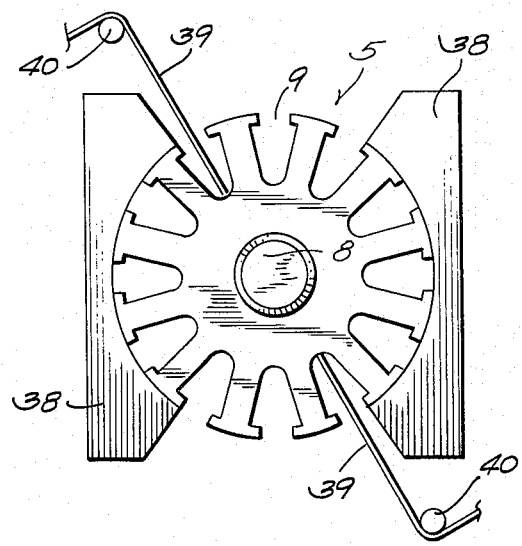
Figure 15:
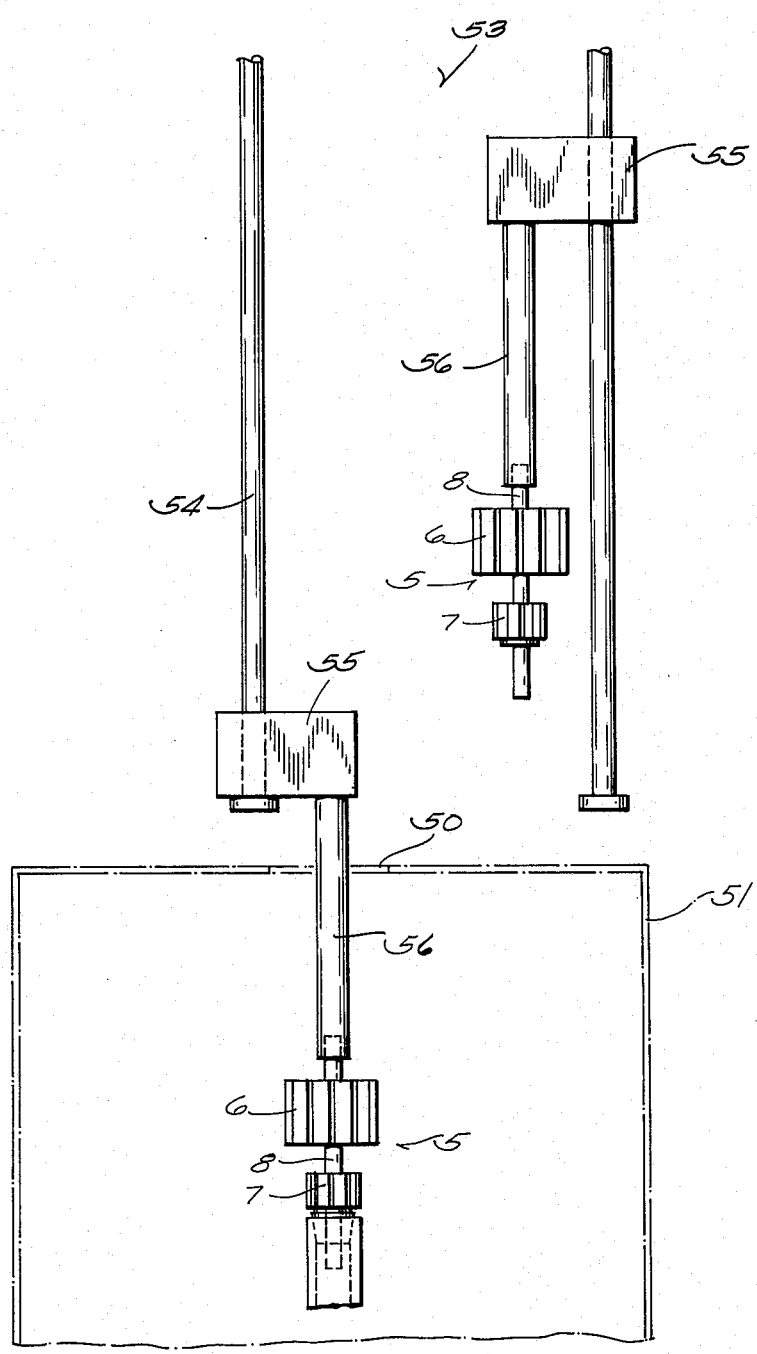

FIG. 6 diagrammatically illustrates one embodiment of the method by which this invention is practiced;

FIGS. 7 and 8 diagrammatically illustrate two modifications of the method depicted in FIG. 6;

FIG. 9 diagrammatically depicts the output of sensing instrumentalities by which the physical characteristics of the armature core assemblies are identified in the practice of this invention;

FIG. 10 is a view similar to FIG. 6, but illustrating the use of a second sensing device by which the locations of the core slots are identified as well as the lead receiving slots in the commutator segments;

FIG. 11 diagrammatically illustrates the need for having the slotted core of the armature core assembly indexed to a predetermined position, for the winding operation to be properly performed;

FIG. 12 diagrammatically depicts the steps in the method of this invention by which — in addition to correct indexing of the armature core assembly during the winding operation — a defective armature core assembly is detected before any winding takes place and, as a consequence thereof, operation of the winding machine is suspended until the defective armature core assembly is replaced with one that is not defective;

FIGS. 13 and 14 diagrammatically illustrate examples of defects in the armature core assembly that are detectable by this invention; and FIG. 15 diagrammatically illustrates one way of automatically placing unwound armature core assemblies in the winding machine and removing wound armatures or defective armature core assemblies from the machine.

Referring to the drawings, and particularly to FIGS. 1 through 8 which were in the original application, the numeral 5 designates generally an armature core assembly representative of the type with which this invention is concerned. As is customary, this assembly consists of a core 6 formed of a stack of steel laminations and a commutator 7, both mounted, in axially spaced relation, on a common shaft 8. The core has the usual circumferentially spaced longitudinally extending slots 9 into which the windings 10 of the armature are wound, part of which are shown in FIG. 3.

The commutator, as is well known, consists of a circle of circumferentially spaced copper bars or segments 11 mounted in a spool of suitable insulating material, and in the present case each bar or segment has a slot 12 cut into its end portion nearest the core. As shown in FIG. 2, the bottom of the slot slopes downwardly towards its open end which faces the core 6.

Since the manner in which wire is wound into the core slots forms no part of this invention and can be accomplished by an automatic armature winding machine in the conventional way, it has not been illustrated. Nor is there any need for a detailed description of the winding procedure, it being sufficient to note that a series of connected coils is wound into pairs of the circumferentially spaced core slots 9, by a flyer or a pair of flyers that rotate about a common axis which perpendicularly intersects the axis of the armature core assembly in position to be wound.

At the completion of each coil, or pair of coils in the case of a two-flyer machine, the wire leads extending from the ends of the just-wound coils are attached to certain of the commutator bars from which they continue to the start of the next-to-be-wound coils, the attachment being made by stuffing a looped portion of the wire forming these leads into the slot in the commutator.

In preparation for the stuffing operation, the flyer from which the wire extends to the end of the just-wound coil, is stopped in a position in which it so holds the wire that a wire gripping or holding device, represented in FIG. 4 by a horn or post 13, can grip the wire. The wire gripping or holding device forms part of the wire attaching instrumentalities associated with that particular flyer, and through coaction between the flyer and the wire gripping or holding device which includes a degree of reverse rotation of the flyer, the wire is looped about the horn or post. As shown in FIG. 4, when that operation is completed, the legs L1 and L2 of the loop are in the positions shown in full lines in FIG. 4, ready to be stuffed into the slot 12 by a blade-like stuffing tool 14, which like the horn or post 13, forms part of the lead attaching instrumentalities. With this invention, the lead attaching instrumentalities do not rotate about the axis of the armature as in the aforesaid Del Bono invention, so that the path along which the lead stuffing tool reciprocates is fixed.

Preferably the width of the commutator slot is such that as the leads are forced into it, the insulation thereon is rubbed off, so that when the stuffing operation is complete, the bared wire is wedged into the bottom of the slot, as shown in FIG. 5.

After the stuffing operation, which is conventional, has been performed, and which takes but a few seconds, the wire gripping and holding device is disengaged from the looped portion of the wire leads and the lead attaching instrumentalities are withdrawn from the proximity of the commutator, to allow the winding of the next coil to be commenced. But, before that takes place, the armature core assembly must be indexed to bring the next pair of core slots into winding-receiving position. The manner in which that is done also forms no part of the invention and can be effected in the conventional way of indexing the core by means of a reciprocating pawl that enters one of the core slots and, by its reciprocation, rotates the core the required amount.

It is the manner in which alignment is established between the commutator bar slots and the lead-attaching instrumentalities that constitutes the concern of this invention. In one specific embodiment of the invention, diagrammatically illustrated in FIG. 6, the winding machine is equipped with an electric motor 15 that is capable of very small increments of rotation as well as larger segments thereof. This motor is so mounted that the shaft 8 of an armature core assembly placed in the winding machine can be directly coupled to the shaft 16 of the motor through a suitable collet 17. The collet is of a type that can be remotely controlled to tighten and release its grip and, when in its gripping condition, securely locks the armature shaft to the motor shaft, so that any rotation produced by the motor - no matter how slight it may be - will be duplicated by the armature core assembly.

The motor shaft also has a shaft encoder 18 coupled to it. A shaft encoder is an electro-mechanical device that can be used to provide an electronic output in the form of a series of identical pulses identifying minute increments of rotation of the shaft to which the encoder is coupled. For the purposes of this invention, the encoder should have sufficient resolution to provide at least 20,000 pulses per 360° of rotation. An encoder that meets the requirements is described in the Technical Bulletin 5-70-G published by the Encoder Division of Litton Industries in Chatsworth, California.

The output of the encoder is fed into the memory bank 19 of a computer 20 where it is compared with a signal that identifies the locations of the slots in the commutator of the armature core assembly in the winding machine. Although the slot location signal can be derived in different ways, one manner of doing so is through the use of a photocell 21 arranged to feed a signal into the computer memory every time it is activated.

As shown in FIG. 6, when in use the photocell is positioned in the space between the armature core and the commutator, with its sensor 22 facing the adjacent end of the commutator and in position to have a light beam 23 (emanating from a suitable light source) strike it every time a slot in the commutator passes the sensor. As will be evident, for this to take place the light source and the photocell must be accurately oriented with respect to one another and so disposed with respect to the commutator of an armature core assembly in position in the winding machine that the light beam is parallel with the sloping bottom of the commutator bar slots.

The unwound armature core assembly is now rotated one full turn by means of the motor 15. During that one rotation the locations of all of the commutator bar slots in sensed by the photocell, and the resulting signals fed into the computer memory along with the output of the encoder. By means of the computer, the slot location information and the output of the encoder fed into the computer memory, are compared and the exact center of each slot with respect to a zero position of rotation of the commutator is established in the computer memory.

The slot position sensing instrumentalities - in this case the photocell and the light source - are now retracted out of the way of the flyers of the winding machine, as indicated in dotted lines in FIG. 6, so that the winding of the coils and the attachment of their leads to their respective commutator bars can proceed.

As noted hereinbefore, the indexing of the armature core assembly to successively bring its core slots into winding receiving position can be done in the conventional way, but it can also be done by appropriately controlled operation of the motor 15. However, at the completion of each coil winding operation, the operation of the motor is controlled by the computer through suitable control instrumentalities 15' in accordance with winding pattern instructions fed into the computer and the aforesaid comparison of the slot locations with the output of the shaft encoder. Whether the winding pattern requires a small or a large increment of rotation on the part of the armature to bring the commutator bar to which a lead attachment is to be made into lead receiving position, the computer controlled operation of the drive motor will always bring the slot in that commutator bar into exact alignment with the fixed path of the lead stuffing tool.

As noted hereinbefore, the sensing of the commutator bar slot locations can be done with means other than a light sensitive sensor, and in FIGS. 7 and 8 two alternative methods of doing so are illustrated. In FIG. 7 the sensor responds to a fluid pressure differential manifested every time a commutator bar slot passes a given point as the commutator is rotated. To this end a hinged air vane 20 is mounted for bodily movement to an from an operative position opposite the orbit of the open ends of the commutator bar slots, and a nozzle 21 is positioned to direct an air blast into the commutator bar slots as they move into position between the nozzle 21 and the air vane. Upon such registry, the air blast passing through the slot impinges the hinged air vane and swings it to a position closing an electric switch 22 which in turn sends a signal to the computer memory bank in the same way the response of the photocell did.

A strictly mechanical sensor can also be used to locate the slot positions, as shown diagrammatically in FIG. 8. In this case a finger 23 is mounted to rock about a fixed fulcrum 24 and biased in the direction to maintain a feeler 25 at the tip of the finger in engagement with the cylindrical surface of the commutator, to drop into the slots 12 as they move into alignment with the finger tip. The resulting rocking of the finger closes a switch 26, which like the switch 22 in the FIG. 7 embodiment, sends a signal to the computer memory.

Those skilled in the art will recognize that in the foregoing disclosure and the accompanying drawings, many conventional details of the apparatus employed to carry the invention into effect have been omitted as unnecessary for an understanding of the invention. Thus, for instance, FIG. 3 does not show the portions of the wire leads that extend between the commutator bar slots and the coils wound onto the armature core.

Another detail not mentioned hereinbefore and not shown in the drawings, is that after the wire leads are stuffed into the commutator bar slots, their looped portions 27 which project beyond the cylindrical surface of the commutator, are cut or sheared off in any suitable way, and that thereafter the leads are soldered or fused to the commutator bars.

The term "computer" as used herein, encompasses any device or instrumentality capable of performing the required calculations, and should not be restricted to its more specialized meaning signifying a sophisticated electronic machine.

The foregoing description is that of the original application, and hence concerns itself only with achieving accurate alignment of the lead receiving slots in the commutator bars or segments with the lead stuffing instrumentalities by which the wire leads from and to the successively wound coils are stuffed into the commutator slots. The invention obviously is not limited to that purpose. It is equally applicable to the indexing of the armature core assembly to successively bring the paired core slots into winding receiving position. For that purpose, as shown in FIG. 10, it is only necessary to provide a second sensing device 30 that identified the locations of the mouths of the core slots 9. This sensing device may be another photocell sensor 31 facing the core 6 and positioned to have a light beam 32 from a suitable light source impinge thereon as the core slots 9 are successively brought into registry with the light beam.

With the addition of the second sensing device, the information fed into the computer memory will identify the locations of the core slots as well as the lead receiving slots in the commutator segments, with respect to a given point on each of the orbits traced by the two series of slots during the recording rotation of the armature core assembly. The signals thus fed into the computer memory could be depicted as in FIG. 9, wherein the row 35 of closely and uniformly spaced lines represents the pulses produced by the encoder; the top line 36 represents the product of the first sensing device that identifies the locations of the commutator bar slots; and the bottom line 37 represents the signal coming from the second sensing device 30. The small "pips" in line 36 signify the narrow spaces between adjacent commutator bars or segments, and the large pulses identify the slots 12 in the commutator bars or segments. By the same token, the pulses in the bottom line identify the slots 9 in the core.

With both the commutator slot and core slot information fed into the computer memory, and the computer programmed to cause the motor 15 to index the armature core assembly, at the completion of each coil winding cycle the motor will rotate the armature core in the direction and through the angle needed to bring the slots in the selected commutator segments, into alignment with the wire stuffing means. After the lead wires have been stuffed into the slots, the motor will index the armature core assembly as needed to bring the paired core slots, into which the next coils are to be wound, to their proper coil receiving positions. In these positions (as indicated in FIG. 11) the mouths of the slots will be so located with respect to the wire guiding shrouds 38 of the winding machine, that the stretches of wire 39 leading from the flyer pulleys 40 will be guided into the core slots as the flyer pulleys travel around their respective orbits. That positioning of the core will be correct for each successive pair of core slots despite variations in the distances between the slots.

As can be readily appreciated, despite all reasonable efforts to avoid it, some armature core assemblies are defective and therefore should be rejected. Defects that are encountered include: the omssion of a lead receiving slot in one or more of the commutator segments; obstruction of those slots in one manner or another; an unacceptable irregularlity in the spacing of the core slots; ragged edges on the mouths of the core slots and obstruction thereof.

Heretofore, unless visual inspection of the armature core assemblies, before they were fed to the winding machine, revealed a defective unit, the defect was not discovered until it caused the winding machine to become jammed, or until the defect showed up in the testing of the wound armature - and even sometimes not until the armature with the defective core or commutator was embodied in a motor.

Since many of the possible defects will be manifested in the signals produced by the sensing instrumentalities by which the commutator slots and the core slots are examined, it follows that comparison of the information obtained by these sensing instrumentalities with a definition of the characteristics of a perfect armature core assembly would immediately identify an armature core assembly as either satisfactory or not. That comparison can take place concomitantly with entry of the slot location information into the memory of the computer. Thus, for instance, if - as depicted in FIG. 13 - one of the commutator segments had not been provided with a slot 12, the photocell would not be activated when that segment crossed the light beam 23; or - if for some reason a commutator slot had some obstruction wedged into it, as shown in FIG. 14 - the comparison of the signal from the photocell 21 with the definition of a perfect armature core assembly recorded in the computer memory, would reveal the assembly to be defective.

By utilizing the product of the aforesaid comparison to produce a control signal and governing the initiation of the coil winding cycle by that signal, the winding operation would take place in the customary manner if the comparison established the armature core assembly to be all right, and would be withheld if the comparison revealed the armature core assembly to be defective, until the defective assembly was replaced with a good one.

As brought out in the portion of this disclosure which was taken from the original application, the sensing means employed to "examine" the armature core assembly can be something other than a photocell. In fact, it is conceivable that the sensing instrumentalities used to "examine" the actual characteristics of the armature core assembly would not require rotation of the assembly. Also, while it is most practical to check the armature core assembly for compliance with a prescribed standard while the assembly is at the winding station of the machine, it could be done before the armature core assembly was placed in the machine.

As noted before, the checking of the armature core assembly for defects can be done concomitantly with the introduction of the slot location information derived from the two photocells into the computer memory, but it need not be done that way. Thus, as shown in FIG. 12, the armature core assembly to be checked can be brought into position to have its characteristics "observed" or identified by any sensing instrumentalities capable of doing so; and which, for purposes of illustration, is represented by the block 45. By feeding what the sensing instrumentalities "see" into a computer type instrumentality (block 46) and then comparing that information with a definition of the correct characteristics of the armature core assembly that has been fed into it, the computer type instrumentality can put out a signal to activate a GO or NO GO control (block 47). The output of this control governs both the operation of the winding machine and its indexing motor 15 to initiate the coil winding operation if the results of the comparison show the armature core assembly to be satisfactory and/or to withhold initiation of the winding operation until the defective armature core assembly has been replaced by one that is not defective.

Loading of unwound armature core assemblies into the machine and removal of wound armatures therefrom, can be done manually - but, for maximum output, is done automatically. FIG. 15 diagrammatically illustrates one approach to automatic loading and unloading. As there shown, the winding machine is of the type wherein the armature core assembly is vertically oriented when at the winding station, being inserted and removed through a hole 50 in the top wall of an enclosure 51 for the machine. An overhead conveyor (not shown) brings unwound armature core assemblies to a transfer mechanism 53 by which wound armatures are lifted from the winding machine and replaced by unwound armature core assemblies. The transfer mechanism may be of any suitable type, but for purposes of illustration it is shown as comprising two tracks 54 on each of which a carriage 55 is mounted for vertical reciprocation by suitable drive means, not shown. Each carriage has a gripper mechanism 56 mounted thereon by which the shaft 8 of an armature core assembly can be gripped. The tracks 54 are laterally shiftable to enable first one and then the other to be brought into a transfer position in which the gripper mechanism of the carriage riding thereon aligns with the axis of the collet 17 in the winding machine. Thus as the carriage on the track in said transfer position is lowered, that carriage can remove a wound armature from the machine and carry it to a conveyor (not shown) by which the wound armatures are taken to another machine where the leads are fused to the commutator segments. As soon as the wound armature is lifted from the winding machine, the other track can be shifted into the transfer position to enable an unwound armature core assembly being carried by its carriage to be lowered into the machine.

While in the foregoing description the successively wound coils are attached to the selected commutator bars or segments by being stuffed into slots, it should be obvious that the invention also encompasses the winding of armatures in which the leads are attached to the commutator by being wrapped around tangs or hooks that project from the commutator bars. In either case, the part of the commutator segments to which the leads are attached travels in a circular orbit past sensing instrumentalities.

Those skilled in the art will also appreciate that the invention can be embodied in forms other than as herein disclosed for purposes of illustration.

The invention is defined by the following claims:

1. In the method of winding armatures and the like, wherein coils of wire are wound onto defined portions of a core assembly by means of an automatic winding machine, and wherein acceptability of the finished product requires the characteristics of the core assembly to satisfactorily meet, within limited tolerances, a predetermined norm, the improvement which comprises:
   A. before any wire is wound onto the core assembly and by means of sensing instrumentalities operatively related to the core assembly, producing a record that reflects the actual characteristics of the core assembly;
   B. by means of a computer type instrumentality comparing said record with a definition of the charcteristics of the core assembly already recorded in said computer type instrumentality, and which definition identifies said predetermined norm; and
   C. utilizing the results of said comparison to produce a signal which
      1. automatically initiates the winding operation in the event said comparison establishes that the actual characteristics of the core assembly satisfactorily meet said norm; or
      2. withholds initiation of the winding operation in the event said comparison reveals that the actual characteristics of the core assembly do not satisfactorily meet said norm.

2. In the method of winding armatures and the like, the improvement set forth in claim 1, further characterized in that:
   the core assembly is in the winding machine at the time said sensing instrumentalities produce the record of its actual characteristics.

3. In the method of winding of an armature wherein an armature core assembly comprising a slotted core and a segmented commutator mounted on a common shaft is placed in an automatic armature winding machine by which coils of wire are successively wound into paired slots in the core and lead wires to and from successively wound coils are attached to selected commutator segments, the improvement which comprises:
   A. before any wire is wound onto the core of an armature core assembly in position in the machine, and by means of sensing instrumentalities incorporated in said machine, producing a record that reflects the actual characteristics of the armature core assembly;
   B. by means of a computer type instrumentality, comparing said record of the actual characteristics of the armature core assembly with a definition of those characteristics of an armature core assembly that is satisfactory; and
   C. utilizing said comparison to produce a signal that effects initiation of the winding operation by the winding machine in the even said comparison establishes that the sensed actual characteristics of the armature core assembly in the machine meet said definition within prescribed tolerances, or withholds initiation of the winding operation in the event said comparison reveals that the sensed actual characteristics of the armature core assembly in the machine fail to meet said definition within the prescribed tolerances.

4. The method of claim 3, further characterized by:
   automatically effecting removal of the unwound armature core assembly from the machine in the event said comparison establishes that the sensed actual characteristics of the armature core assembly fail to meet said definition within the prescribed tolerances.

5. The method of claim 3, wherein the wire is guided into the paired slots by shrouds that embrace the armature core assembly and require the armature core to be in a position of rotation at which the mouths of the paired core slots occupy a predetermined positional relationship with respect to said shrouds, and further characterized by:

A. including in said comparison that takes place in the computer type instrumentality, a comparison of the sensed locations of the mouths of said paired core slots with a definition of the predetermined positional relationship thereof with respect to said shrouds; and B. in response to said comparison, automatically imparting rotation to the armature core assembly as needed to bring the paired core slots into said predetermined positional relationship with respect to said shrouds.

6. The method of claim 3, wherein the attachment of the wire leads to the portions of the commutator segments to which they are to be attached is effected by lead attaching instrumentalities that require a predetermined positional relationship between said portion of the selected commutator segment and said lead attaching instrumentalities, and which relationship is established by relative rotation between the armature core assembly and said lead attaching instrumentalities, and further characterized by:

A. including in said comparison that takes place in the computer type instrumentality, a comparison of the sensed location of the portion of the commutator segment to which a lead is to be attached, with a definition of the correct position of said portion of the commutator segment to which the lead is to be attached; and B. in response to said comparison, automatically effecting relative rotation between the armature core assembly and said lead attaching instrumentalities as needed to bring the same into their correct positional relationship.

7. The method of claim 6, wherein said relative rotation is effected by rotating the armature core assembly.

8. In the method of winding armatures on an automatic armature winding machine, wherein an armature core assembly having a slotted core and a segmented commutator mounted on a common shaft is placed in the machine to have the machine automatically and successively wind coils of wire into paired slots in the core and attach the leads that extend from and to successive coils to certain of the commutator segments, the improvement which comprises the steps of:

A. recording in a computer type instrumentality, data that correctly defines the characteristics of an armature core assembly that is free of any defects;

B. before any wire is wound onto each armature core assembly placed in the winding machine, and by means of sensing instrumentalities operatively related to the armature core assembly in the machine, producing a record that reflects the actual characteristics of that armature core assembly;

C. introducing said record of the actual characteristics of that armature core assembly into said computer type instrumentality;

D. by means of said computer type instrumentality, comparing said record of the actual characteristics of the armature core assembly with said recorded data; and E. utilizing the results of said comparison to produce a signal by which 1. initiation of the winding operation is automatically effected if said comparison establishes that the armature core assembly is free of defects, or 2. initiation of the winding operation is withheld in the event said comparison reveals that the armature core assembly is defective in any respect.

9. In the method of winding armatures, the improvement set forth in claim 8, further characterized by:
effecting automatic removal from the winding machine of any armature core assembly that said comparison has found to be defective.

10. The method of claim 8, wherein said sensing of the actual characteristics of each armature core assembly is done by effecting relative rotation between said sensing instrumentalities and the armature core assembly about the axis of the latter.

11. The method of claim 10, wherein said relative rotation results from rotating the armature core assembly about its axis while said sensing instrumentalities are held against rotation about said axis.

12. In the method of winding armatures which begins with placement of an unwound armature core assembly having a slotted core and a segmented commutator on a common shaft in an automatic armature winding machine by which coils of wire are successively wound into paired core slots and wire leads to and from the successively wound coils are attached to parts of selected commutator segments, said core slots and said parts of the commutator segments comprising two different series of circumferentially spaced wire receiving means, each of which travels in a circular orbit as the armature core assembly is rotated about its axis, and which machine requires the paired core slots into which wire is to be wound to be in predetermined angular positions before the winding operation begins, and also requires the wire receiving part of the commutator segments to which a lead is to be attached to be in a predetermined angular position before the attachment of the lead can be effected, the improvement by which said angular positions of said wire receiving means are accurately and quickly achieved, and which comprises:

A. rotating the unwound armature core assembly about its axis through a predetermined angle to thereby carry both series of wire receiving means around their respective orbits;

B. while the unwound armature core assembly is thus rotated and by means of sensing instrumentalities identifying the locations of the individual wire receiving means with respect to a point in the orbit of each of said series, and recording that information in a retrievable manner;

C. thereafter between the winding of the successively wound coils and by power means capable of effecting minute increments of rotation as well as fast rotation through substantial angles, effecting incremental rotation of the armature core assembly to successively bring the paired core slots into winding receiving position and also bring said wire receiving parts of the commutator segments into a lead receiving position; and D. by means of a computer-type instrumentality into which said recorded information has been fed, so controlling said power means that the paired core slots are quickly and accurately brought into winding receiving position and the lead receiving parts of the commutator segments are likewise quickly and accurately brought to the lead receiving position.

13. The method of claim 12, wherein said power means is an electric motor.

14. In the method of winding armatures of the type in which the wire leads connecting the coils that are wound onto the core of the armature are attached to their respective commutator bars by stuffing them into slots cut into the bars, the improvement whereby, preparatory to the stuffing operation, accurate alignment is assured between each commutator bar slot and the means employed to stuff the wire leads into the slots, which improvement comprises the steps of:
  A. before any wire is wound onto the armature core, rotating the same through substantially one complete turn;
  B. as the unwound armature core is thus rotated, sensing the location of each commutator bar slot with respect to the full circumference of the commutator and recording that information;
  C. at the completion of the winding of each coil, effecting relative rotation between the commutator and the means employed to stuff the wire leads into its slots, to bring a predetermined commutator bar into juxtaposition to the lead stuffing means; and
  D. utilizing said recorded information to control the angle through which said relative rotation takes place and thereby bring the slot in said predetermined commutator bar and the means employed to stuff the leads into the slots into accurate alignment.

15. The method of claim 14, wherein the location of the commutator bar slots is sensed by closing an electric circuit by means of a sensor positioned to recognize the passage of a commutator bar slot as the commutator is rotated.

16. The method of claim 15, wherein said sensor is light sensitive, and the passage of a commutator bar slot past a given point during rotation of the commutator, allows a light beam to impinge upon the sensor.

17. The method of claim 15, wherein said sensor is responsive to a fluid pressure differential, and the passage of a commutator bar slot past a given point during rotation of the commutator, subjects the sensor to said fluid pressure differential.

18. The method of claim 14, wherein the location of the commutator bar slots is sensed by the impingement of a light beam onto a light sensitive sensor so located that the light beam is interrupted by the portions of the commutator bars flanking their slots.

19. The method of claim 14, wherein said sensed locations of the commutator bar slots are recorded in the memory bank of a computer; wherein said relative rotation is produced by electrically controllable drive means; and wherein the operation of said drive means is controlled by said computer.

20. In the method of winding armatures of the type in which the wire leads connecting the coils that are wound onto the core of the armature are attached to their respective commutator bars by stuffing them into slots cut into the bars, the improvement whereby, preparatory to each stuffing operation, accurate alignment is assured between the commutator bar slot and the means employed to stuff the wire leads into the slot, which improvement comprises the steps of:
  A. before any wire is wound onto the armature core, sensing the location of the slots in the commutator bars with respect to one another around the circumference of the commutator;
  B. feeding the slot location information along with a record of exactly equispaced subdivisions of the circumference of the commutator into the memory bank of a computer;
  C. from the information thus fed into the memory bank of the computer and by means of the computer, calculating and recording the exact location of the center of each commutator slot with respect to a zero position of rotation of the commutator; and
  D. between coil winding operations, and by means of a motor controlled by the computer using the said information fed into its memory bank, effecting relative rotation between the commutator and the means employed to stuff leads into the commutator bar slots to bring the same into exact alignment preparatory to the connection of each lead to its respective commutator bar.

21. In the method of winding armatures, the improvement defined in claim 20, wherein said relative rotation between the commutator and the means employed to stuff leads into the commutator slots is produced by drivingly connecting the armature with said motor and thereby rotating the commutator while the means employed to stuff leads into the slots is restrained against rotation about the axis of the armature.

22. In the method of winding armatures, the improvement defined in claim 20, wherein the sensing of the slot locations is done by rotating the armature to carry the slots in its commutator bars sequentially past a sensor operable to produce a signal as each slot passes the same.

23. In the method of winding armatures, the improvement defined in claim 22, wherein the record of equispaced subdivisions of the circumference of the commutator is produced with a shaft encoder rotating in unison with the armature.

24. In the method of winding armatures of the type in which the wire leads connecting the coils that are wound onto the core of the armature are attached to their respective commutator bars by stuffing them into slots cut into the bars, the improvement whereby, preparatory to each stuffing operation, accurate alignment is assured between the commutator bar slot and the means employed to stuff the wire leads into the slot, which improvement comprises the steps of:
  A. before any wire is wound onto the armature core, moving a photocell into juxtaposition to the end of the commutator to which the slots open;
  B. directing a light beam onto the commutator and towards the core of the armature at such an angle to its axis that the light beam can pass through the slots and impinge upon the photocell as the commutator is rotated;
  C. connecting a shaft encoder to the commutator to rotate therewith;
  D. simultaneously rotating the commutator and the encoder to produce a series of encoder-produced signals that are precisely equispaced and another series of photocell produced signals that identify the passage of the leading and trailing edges of the commutator bar slots into and out of said light beam;
  E. correlating said encoder-produced and said photocell-produced signals by feeding them into a computer memory;
  F. with the computer using the information thus fed into its memory, calculating the location of the center of each commutator bar slot with respect to a zero position of rotation of the commutator and entering the results of said calculation in the computer memory;

G. moving the photcell out of the way;

H. initiating and proceeding with the coil winding operation by which a series of connected coils is wound onto the core of the armature and the leads connecting the coils of the series are attached to bars of the commutator by lead stuffing means which stuffs the leads into slots cut into the bars; and I. by means of a motor controlled by the computer and between the successive coil winding operations, effecting such relative rotation between the lead stuffing means and the commutator as needed to effect exact alignment between the lead stuffing means and the slot in the commutator bar into which said means is about to stuff leads.

25. In the method of winding an armature and attaching the lead wires that connect the coils of its winding to the bars of the armature commutator by stuffing the lead wires into slots cut into the commutator bars, and wherein a lead stuffing tool constrained to reciprocation along a path radial to the axis of the armature stuffs the leads into the commutator bar slots, the improvement whereby, preparatory to each lead stuffing operation, accurate alignment is assured between the commutator bar slot and the path to which the lead stuffing tool is constrained, which improvement comprises:

A. rotating the unwound armature and a shaft encoder coupled thereto through one full turn;

B. during that rotation of the unwound armature, sensing the locations of the commutator bar slots with respect to a scale consisting of minutely and uniformly spaced subdivisions of that full turn derived from the output of the shaft encoder;

C. feeding said slot location information into the memory bank of a computer;

D. by means of the computer and utilizing the information fed into its memory bank, calculating and recording the location of the center of each commutator bar slot with respect to a zero position of rotation of the commutator;

E. initiating and proceeding with the winding of the armature; and

F. by means of the computer controlling the operation of a motor that is drivingly connected with the armature to index the same at the conclusion of each coil winding operation and accurately align one of the commutator bar slots with the path to which the lead stuffing tool is constrained.

* * * * *